US010098482B2

United States Patent
McLees

(10) Patent No.: US 10,098,482 B2
(45) Date of Patent: Oct. 16, 2018

(54) CHECK STAND CONVEYOR VACATED SHOPPING BIN

(71) Applicant: Don McLees, Everett, WA (US)

(72) Inventor: Don McLees, Everett, WA (US)

( * ) Notice: Subject to any disclaimer, the term of this patent is extended or adjusted under 35 U.S.C. 154(b) by 0 days.

(21) Appl. No.: 14/999,861

(22) Filed: Jul. 13, 2016

(65) Prior Publication Data

US 2018/0016105 A1 Jan. 18, 2018
US 2018/0118475 A9 May 3, 2018

Related U.S. Application Data

(63) Continuation of application No. 12/459,154, filed on Jun. 26, 2009.

(51) Int. Cl.
*A47F 9/04* (2006.01)
*B65G 65/00* (2006.01)

(52) U.S. Cl.
CPC .............. *A47F 9/045* (2013.01); *B65G 65/00* (2013.01)

(58) Field of Classification Search
CPC ........ B65G 65/02; B65G 15/00; B65G 65/00; A47F 9/045
See application file for complete search history.

(56) References Cited

U.S. PATENT DOCUMENTS

| 3,036,722 | A | | 5/1962 | Sharaway | |
|---|---|---|---|---|---|
| 3,306,398 | A | | 2/1967 | LaChance | |
| 3,446,315 | A | * | 5/1969 | Close | B62B 3/148 186/64 |
| 3,792,757 | A | * | 2/1974 | Musser | A47F 9/04 186/64 |
| 3,924,709 | A | | 12/1975 | Swanson | 186/64 |
| 4,043,426 | A | | 8/1977 | Verkler | 186/61 |
| 4,373,611 | A | | 2/1983 | Frederick | 186/64 |
| 8,172,256 | B2 | * | 5/2012 | Fine | B62B 3/027 280/38 |
| 2010/0329830 | A1 | * | 12/2010 | McLees | B65D 21/0233 414/416.04 |

* cited by examiner

*Primary Examiner* — Saul Rodriguez
*Assistant Examiner* — Ashley K Romano
(74) *Attorney, Agent, or Firm* — Clark A. Puntigam; Jensen & Puntigam, P.S.

(57) ABSTRACT

A shopping bin which attaches to the top of a cart. The bin is detachable from the cart and can be slid onto the conveyor belt of a conventional check stand. The bin mechanism allows the conveyor belt to vacate the contents of the bin.

2 Claims, 3 Drawing Sheets

CHECK STAND CONVEYOR VACATED SHOPPING BIN

FIELD OF THE INVENTION AND OBJECT OF THE INVENTION

The field of the invention is shopping and the object of the invention is to provide a large capacity shopping bin that can be easily attached to the top of any standard shopping cart and then after shopping can be easily detached and slid onto the conveyor belt of a check stand and thereby eliminate the need for the customer to unload individual items from the cart to the conveyor. Another object of the invention is to provide such a bin that has mechanism allowing the contents to be vacated by the movement of the conveyor belt and thereby eliminate the need for the checker to have to reach any further than if the items were on the conveyor. Yet another object is to provide such a bin that can be stacked one inside the other in nesting fashion and therefore require minimal storage space. A further object is to have the bin mechanism interrupt the check stand electronic photo beam and stop the conveyor as each item is vacated and hereby allow the conveyor to function in its normal manner as if the bin were not present. A still further object of the invention is to provide such a bin that requires no modification of the shopping cart and minimal modification of the check stand.

SUMMARY OF THE INVENTION INCLUDING BACKGROUND AND PRIOR ART

As technology has evolved the general trend in shopping market layout has been toward conveyor belt check stands with most stores requiring the customers to unload items from their shopping carts onto the belt which then moves the items to the checker who manually passes the items by a scanner for identification and pricing. One of the problems with such a system is that most customers would prefer not to be burdened by the task of unloading each item from their cart. Another related problem from the customer's perspective is that while they are occupied by the task of unloading the cart their attention is diverted from the register display showing prices as the checker scans items. A problem with the system from the store's perspective is often evident when an elderly or otherwise physically handicapped customer cannot keep up with the conveyor/checker and thus impedes throughput. Some shoppers place a hand carried basket of items on the conveyor which simply transfers the burden of item removal to the checker and the baskets have small capacity compared to the bin of this disclosure.

The desire to eliminate the current inefficiencies led to this invention, the conveyor vacated shopping bin. Envisioned is a nested stack of bins available to the customers as they access their shopping carts. The bin is placed crosswise on top of the cart at the front leaving room to the rear for placement of bulk items into the cart. The customer then places all the desired smaller items into the bin. Since an opaque bin may make it more difficult for the customer to identify their particular shopping cart by viewing items inside from a distance should they wander away to seek individual items, envisioned is either a transparent bin or a system of multi-colored bins.

At the check stand the configuration of the bottom of the bin allows the customer to simply twist and pull the bin to separate it from the cart, allowing the bin to be slid onto the check stand conveyor belt with the aid of a small roller at the front of the bin. Thus the customer does not have to lift the weight of the bin and its contents.

The conveyor then moves the bin to the check stand photo beam where a beam interrupter attached under the bin front door breaks the photo beam which causes the conveyor to stop. When the checker opens the front door of the bin the beam interrupter is moved out of the path of the photo beam which causes the conveyor to start and move the bin a short distance to a bin stop alongside the belt. But while the bin has been stopped the conveyor keeps moving. Inside the bin at the back are a back plate and a bottom plate which form an evacuating plunger that is not directly attached to the bin but rather is attached through slots to runners under the bin. Thus the moving conveyor causes the evacuating plunger to push the items toward the door opening at the checker. While the evacuating plunger is a very simple means of vacating bin contents it should be noted that other mechanisms could be used, such as a conveyor belt inside the bin powered by a roller in contact with the check stand conveyor.

An item sensor at the front of the bin activates another beam interrupter which causes the conveyor to stop each time a new item arrives. Thus the check stand still functions in the same manner as if the bin were not there. The evacuator also activates the beam interrupter when it reaches the front of the bin causing the conveyor to stop. It should be herein mentioned that the item detector need not be mechanical but could be simply the check stand beam diverted by mirrors inside the bin. When vacated the checker picks up the bin and tilts it, causing the evacuator to slide back and the door to close. The bin can then be nested into another stack. Also envisioned is a conveyor vacated bin that incorporates means for product identification such as a bar code scanner or a radio frequency tag reader. It should also be noted that the cart need not be a standard shopping cart but could be a specialized cart if so desired.

Several inventions have taught how to make check stand operation more efficient. These include U.S. Pat. Nos. 3,036,722, 3,306,398, 3,924,709 (Swanson) and U.S. Pat. No. 4,373,611, All of which incorporate a conveyor in a cart. U.S. Pat. No. 4,043,426 (Verkler) shows a cart with a basket that is slidable to the checker. The Verkler patent does not use the standard check stand conveyor belt for evacuation and still requires individual items to be manually extricated from the bin. As a matter of fact the Verkler patent is intended for a check stand which does not even have a conveyor, a rarity in today's technology. The Verkler patent also requires a specialized cart. A distinct advantage of the conveyor vacated shopping bin besides not requiring a special conveyor is that contrary to the Verkler patent it also does not require a specialized cart. The Swanson patent (U.S. Pat. No. 3,924,709) requires a complicated and expensive bin with a built in conveyor and does not use the standard check stand conveyor belt but rather requires a special roller drive system to be added to the check stand, a requirement that the current chains of super markets would highly object to. The Swanson invention also is intended for the currently rare check stand that doesn't even have a conveyor. All cited approaches require an expensive cart and extensive modifications to the check stand. The customer is required to position the cart correctly for unloading. Either all bulk items must go through the same unloading and scanning procedure, cumbersome at best, or a separate special procedure would be needed. Only one customer can be served at a time whereas the conveyor vacated bin system allows one bin or indeed even individual items to be placed on the conveyor as the former bin is being evacuated. The slidable basket version is further restricted by a trade off between capacity and distance the checker must reach for items.

DETAILED DESCRIPTION OF THE DRAWINGS OF THE PREFERRED EMBODIMENT

Figure 1:
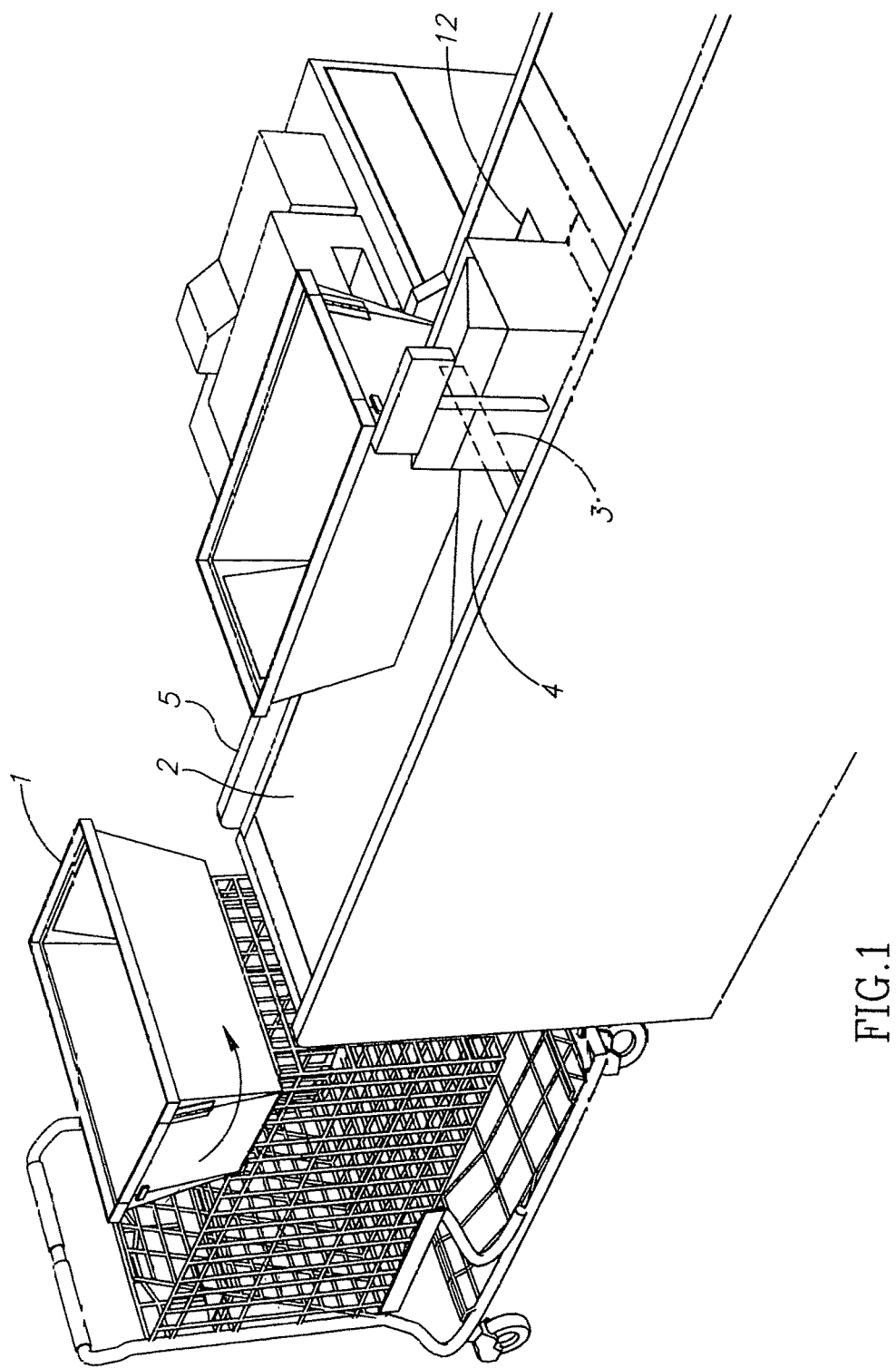
FIG. 1 shows the bin cross-mounted on the cart at the check stand prior to removal and a second bin in its unload position on the conveyor.

The arrow of FIG. 1 shows the direction the bin (1) is twisted to release it from the cart prior to the bin being slid onto the check stand conveyor (2) by the customer. A second bin has been moved by the conveyor to the bin stop (3) and is shown in its unload position. The bin has been guided to its unload position by the outer rail bin guide (4) and the check stand inner guide rail (5).

Figure 2:
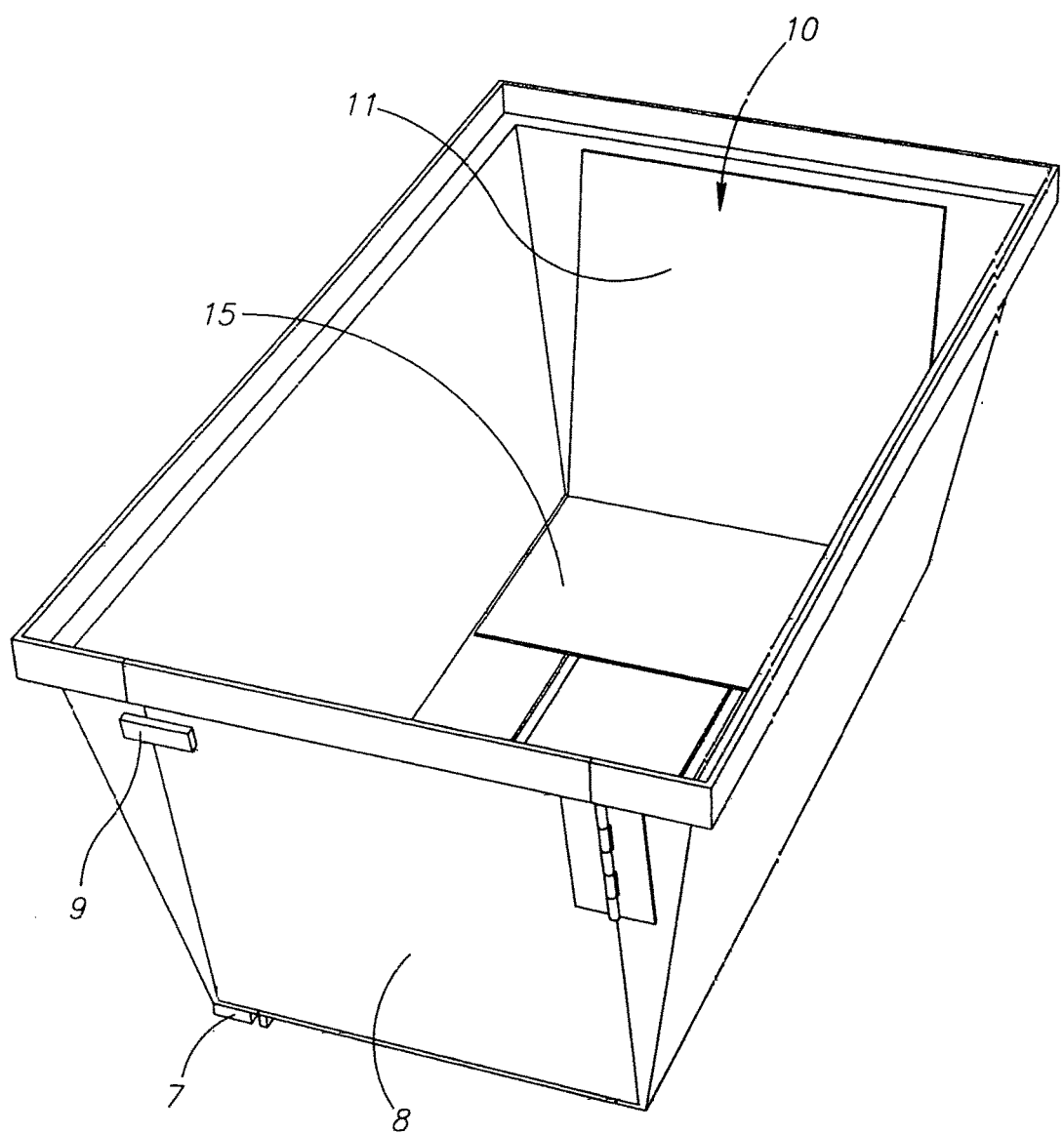
FIG. 2 is a detailed drawing of inside the bin as viewed from the door end.

The basic workings of the bin can be seen in FIG. 2. The bin evacuation process begins when the checker unlatches the bin door catch (9) and opens the bin door (8) with its attached beam interrupter (7). This action opens the photo beam which in turn initiates conveyor movement. The back plate (11 of FIG. 2) with the bottom plate (15) form the evacuator (10) which is attached by fasteners going through the bin slots (16 of FIG. 3) to runners (17 of FIG. 3) under the bin. The fasteners have spacers such that the bottom plate of the evacuator is in contact only with the runners. With the weight of the items on the bottom plate transferred to the runners in contact with the conveyor and not on the bottom of the bin, and since the bin cannot move because it is being held by the bin stop (3 of FIG. 1), the laws of physics dictate that the moving conveyor must move the evacuator and the rest of the items in the bin forward.

Figure 3:
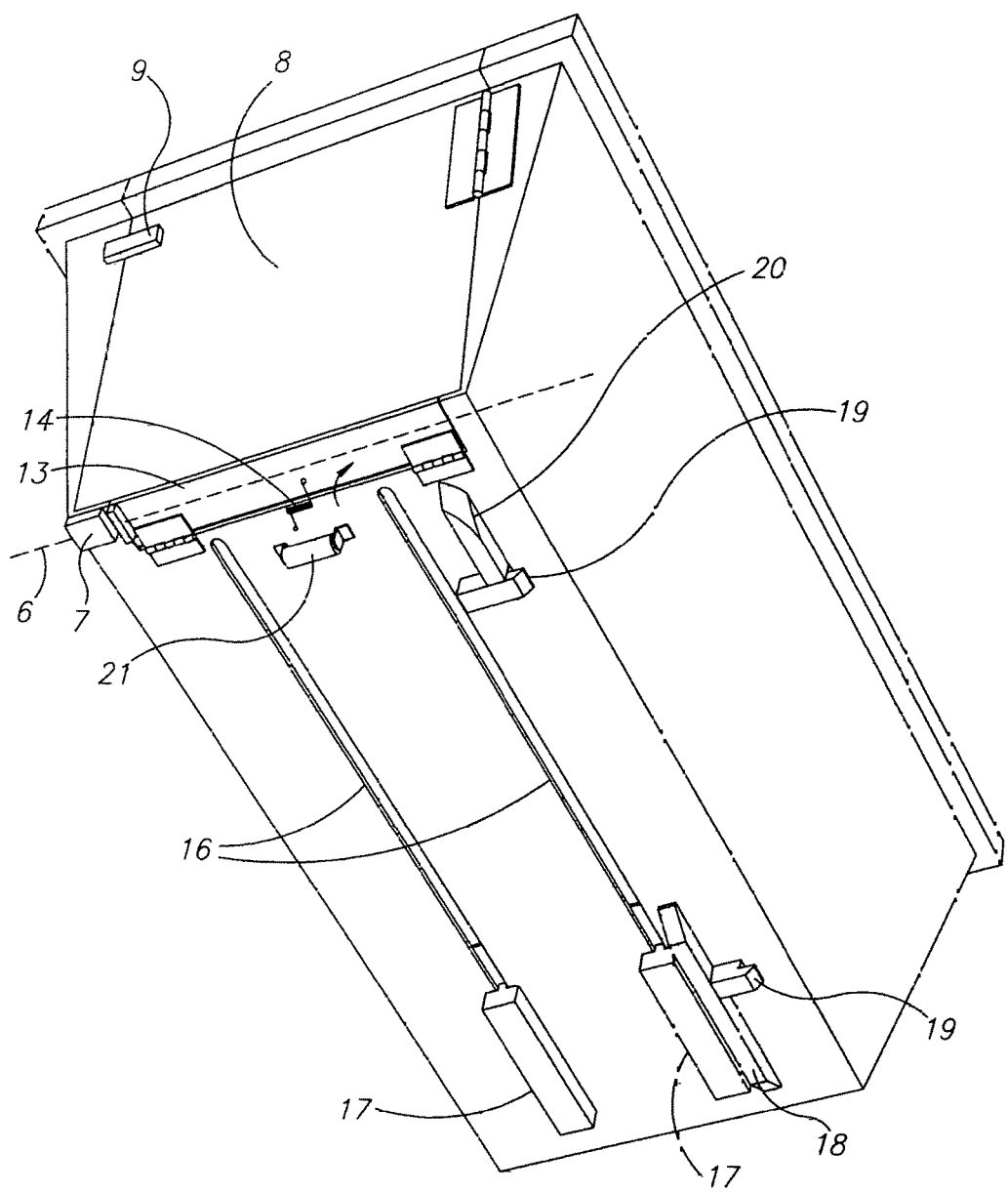
FIG. 3 is a detailed drawing of the bottom of the bin also as viewed from the door end.

FIG. 3 shows the configuration underneath one version of the preferred embodiment. The versions may change slightly depending on the specifics of the particular cart to which the bins will be attached. The guides (18 and 20) center the bin on the cart and position it for the lock tabs (19) to engage the top rail of the cart as the bin is slid forward. Since cart designs are varied, and indeed some don't even have a top rail, the exact means of bin engagement with the shopping cart may vary. The left lock in the drawing (which would be the right hand lock with the bin positioned on the cart) has a tapered wedge releasing protrusion (20). As the bin is twisted the protrusion lifts the lock over the cart top rail and the front roller (21) aids in sliding the bin onto the conveyor. While it is not the purpose here to describe every possible bin configuration, clearly the addition of rollers, wheels or other friction reducing devices could lessen the force required to move the bin from the car to the conveyor depending on the specifics of the particular shopping cart. The right runner in the drawing (left runner as the bin is positioned on the conveyor) in the preferred embodiment may be made of a material with a higher coefficient of friction than the left runner thus establishing a torque force as the conveyor slides in contact with the runners and thereby pushes the bin against the left check stand guide rail (5 of FIG. 1). Once the bin is in its final unload position the front roller (21) eliminates any forward force on the bin from the conveyor as the conveyor moves the evacuator and the bin contents toward the scanner (12 of FIG. 1). The item detector strip (13) and its torsional return spring (14) is shown at the front of the bin.

What is claimed is:

1. A conveyorless shopping bin in operable combination with a separate check-stand assembly which includes a conveyor belt, said shopping bin, which is openable at a front end, having a bottom portion and an evacuator assembly, said evacuator assembly being initially located substantially toward a rear of said shopping bin and comprising a bottom plate and a rear plate, both of said plates extending substantially across the width of said shopping bin, the shopping bin including runner elements located beneath said bin and fastener elements which are attached to the runner elements and pass through longitudinal slots in the bottom portion of the shopping bin, the fastener elements being connected to the bottom plate of the evacuator assembly, so that when the check-stand assembly holds the shopping bin, with the runner elements on the conveyor belt, and the conveyor belt moves in operation, the runner elements move therewith, thereby moving the evacuator assembly to a position toward the front end of said shopping bin.

2. The shopping bin of claim 1, wherein the longitudinal slots comprise two substantially parallel slots extending substantially the length of said shopping bin.

* * * * *